United States Patent
Na et al.

(10) Patent No.: US 8,035,920 B2
(45) Date of Patent: Oct. 11, 2011

(54) PERPENDICULAR MAGNETIC RECORDING HEAD HAVING COIL PORTIONS ABOVE A MAIN POLE AND PROVIDED WITH DIFFERENT CROSS-SECTIONAL SHAPES AND METHOD OF MANUFACTURING THE SAME

(75) Inventors: Kyoung-won Na, Seoul (KR); Kook-hyun Sunwoo, Hwaseong-si (KR); Joo-ho Lee, Seoul (KR); Jae-chul Shim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 977 days.

(21) Appl. No.: 11/951,363

(22) Filed: Dec. 6, 2007

(65) Prior Publication Data

US 2008/0316646 A1 Dec. 25, 2008

(30) Foreign Application Priority Data

Jun. 25, 2007 (KR) ........................ 10-2007-0062489

(51) Int. Cl.
*G11B 5/17* (2006.01)
*G11B 5/39* (2006.01)

(52) U.S. Cl. ......... 360/123.03; 360/123.05; 360/123.08; 360/317; 29/603.13

(58) Field of Classification Search ............. 360/123.03, 360/123.05, 123.06, 123.08, 123.1, 125.02, 360/125.03, 125.06, 125.08, 317, 603.07, 360/603.13, 603.14
See application file for complete search history.

(56) References Cited

U.S. PATENT DOCUMENTS

| | | | | |
|---|---|---|---|---|
| 4,639,811 A * | 1/1987 | Diepers et al. | ........... | 360/125.15 |
| 5,255,141 A * | 10/1993 | Valstyn et al. | ................ | 360/321 |
| 6,639,754 B2 * | 10/2003 | Taguchi et al. | .......... | 360/125.12 |
| 6,751,054 B2 * | 6/2004 | Sato et al. | ................ | 360/125.06 |
| RE38,594 E * | 9/2004 | Murata et al. | ............ | 360/123.05 |
| 7,174,621 B2 * | 2/2007 | Sato et al. | .................. | 29/603.13 |
| 7,443,632 B1 * | 10/2008 | Stoev et al. | .............. | 360/123.05 |
| 7,495,864 B2 * | 2/2009 | Kobayashi | .................. | 360/123.1 |
| 7,768,744 B2 * | 8/2010 | Hsiao et al. | .............. | 360/125.18 |
| 2007/0121249 A1 * | 5/2007 | Parker | .......................... | 360/126 |

FOREIGN PATENT DOCUMENTS

| | | |
|---|---|---|
| JP | 11-328617 A | 11/1999 |
| KR | 10-2006-0100831 A | 9/2006 |

\* cited by examiner

*Primary Examiner* — Jefferson Evans
(74) *Attorney, Agent, or Firm* — Sughrue Mion, PLLC

(57) ABSTRACT

A perpendicular magnetic recording head and a method of manufacturing the same are provided. The perpendicular magnetic recording head that includes a main pole, a return yoke, and coils that surround upper and lower parts of the main pole in a solenoid shape so that the main pole generates a magnetic field for recording information onto a recording medium, wherein a portion of the coils that pass above the main pole comprises a plurality of first coils and at least one second coil having a cross-sectional shape different from that of the first coils, and the second coil is formed across upper regions of two first coils adjacent to each other among the first coils.

25 Claims, 13 Drawing Sheets

PERPENDICULAR MAGNETIC RECORDING HEAD HAVING COIL PORTIONS ABOVE A MAIN POLE AND PROVIDED WITH DIFFERENT CROSS-SECTIONAL SHAPES AND METHOD OF MANUFACTURING THE SAME

CROSS-REFERENCE TO RELATED PATENT APPLICATION

This application claims priority from Korean Patent Application No. 10-2007-0062489, filed on Jun. 25, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to a perpendicular magnetic recording head and a method of manufacturing the same, and more particularly, to a perpendicular magnetic recording head having an improved high frequency characteristic by reducing the inductance thereof, and a method of manufacturing the same.

2. Description of the Related Art

Magnetic recording methods can be classified into longitudinal magnetic recording methods and perpendicular magnetic recording methods. In a longitudinal magnetic recording method, information is recorded based on the magnetization direction of a magnetic layer that is parallel to a surface of the magnetic layer, and in a perpendicular magnetic recording method, information is recorded based on the magnetization direction of a magnetic layer that is perpendicular to the surface of the magnetic layer. In terms of recording density, the perpendicular magnetic recording method is superior to the longitudinal magnetic recording method, and thus, various perpendicular magnetic recording heads have been developed.

FIG. 1 is a cross-sectional view of a related art perpendicular magnetic recording head 10. Referring to FIG. 1, the related art perpendicular magnetic recording head 10 includes a recording head unit that includes a main pole 22, a return yoke 24, a sub-yoke 28, and a coil 26 and a read head unit that includes two magnetic shield layers 30 and a magnetic resistance device 15 interposed between the two magnetic shield layers 30. The coil 26 surrounds the main pole 22 and the sub-yoke 28 in a solenoid shape, and when a current is applied to the coil 26, the main pole 22, the sub-yoke 28, and the return yoke 24 form a magnetic path of the magnetic field. The magnetic path that proceeds towards a recording medium (not shown) from the main pole 22 magnetizes a recording layer of the recording medium in a perpendicular direction and returns to the return yoke 24 and thus, recording is performed. The magnetic resistance device 15 can read information recorded in the recording medium by the characteristics of changing electrical resistance by a magnetic signal generated from the magnetization of the recording layer.

In the perpendicular magnetic recording head 10, the return yoke 24 is formed according to the shape of an insulating layer 27 that covers the coil 26. The shape of the insulating layer 27 is naturally formed in a process of spin coating a photoresist for covering the entire coil 26 and hard baking the photoresist. The length L and height H of the insulating layer 27 formed between the return yoke 24 and the main pole 22 directly affect the shape of the return yoke 24, and also determines the total length of the magnetic path. The length of the magnetic path directly affects the inductance of the perpendicular magnetic recording head 10, and the longer the magnetic path is, the higher the inductance is. Also, to increase the recording density, a high frequency current is applied to the coil 26. However, since the main pole 22, the return yoke 24, and the sub-yoke 28 are generally formed of a magnetic material having electrical conductivity, an eddy current is generated at high frequency. The eddy current causes a further increase in the inductance at high frequency. Accordingly, the inductance increases a rise time of a magnetic field with respect to a current, that is, the inductance generates an interval between the time when a current is applied to the coil 26 and the time when the recording magnetic field is formed in the main pole 22. The time interval causes thermal noise, and thus, reduces the high frequency characteristics of the perpendicular magnetic recording head 10. Therefore, it is needed to design a perpendicular magnetic recording head having reduced inductance in order to achieve high density recording.

SUMMARY OF THE INVENTION

To address the above and/or other aspects, the present invention provides a perpendicular magnetic recording head that has reduced inductance and improved frequency characteristics by minimizing spacings between coils and a length of a magnetic path formed along a main pole and a return yoke, and a method of manufacturing the perpendicular magnetic recording head.

According to an aspect of the present invention, there is provided a perpendicular magnetic recording head that comprises: a main pole; a return yoke; and coils that surround upper and lower parts of the main pole in a solenoid shape so that the main pole generates a magnetic field for recording information onto a recording medium, wherein a portion of the coils that pass above the main pole comprises a plurality of first coils and at least one second coil having a cross-sectional shape different from that of the first coils, and the second coil is formed across upper regions of two first coils adjacent to each other from among the first coils.

The second coil may be formed in a region between the two first coils adjacent to each other and across upper regions of each of the two first coils.

The second coil may have a T shape cross-section.

The perpendicular magnetic recording head may further comprise an insulating layer having a thickness of 2000 Å or less between the first coil and the second coil, and the insulating layer may be formed using an atomic layer deposition (ALD) method.

According to an aspect of the present invention, there is provided a method of manufacturing a perpendicular magnetic recording head that comprises coils that surround upper and lower parts of a main pole in a solenoid shape, the method comprising: (a) forming a lower coil layer on a magnetic shield layer; (b) forming a magnetic layer including a main pole on the lower coil layer; (c) forming a first insulating layer on the magnetic layer; and (d) forming an upper coil layer that comprises a plurality of first coils and at least one second coil formed across upper regions of two first coils adjacent to each other from among the first coils on the first insulating layer.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

Figure 1:
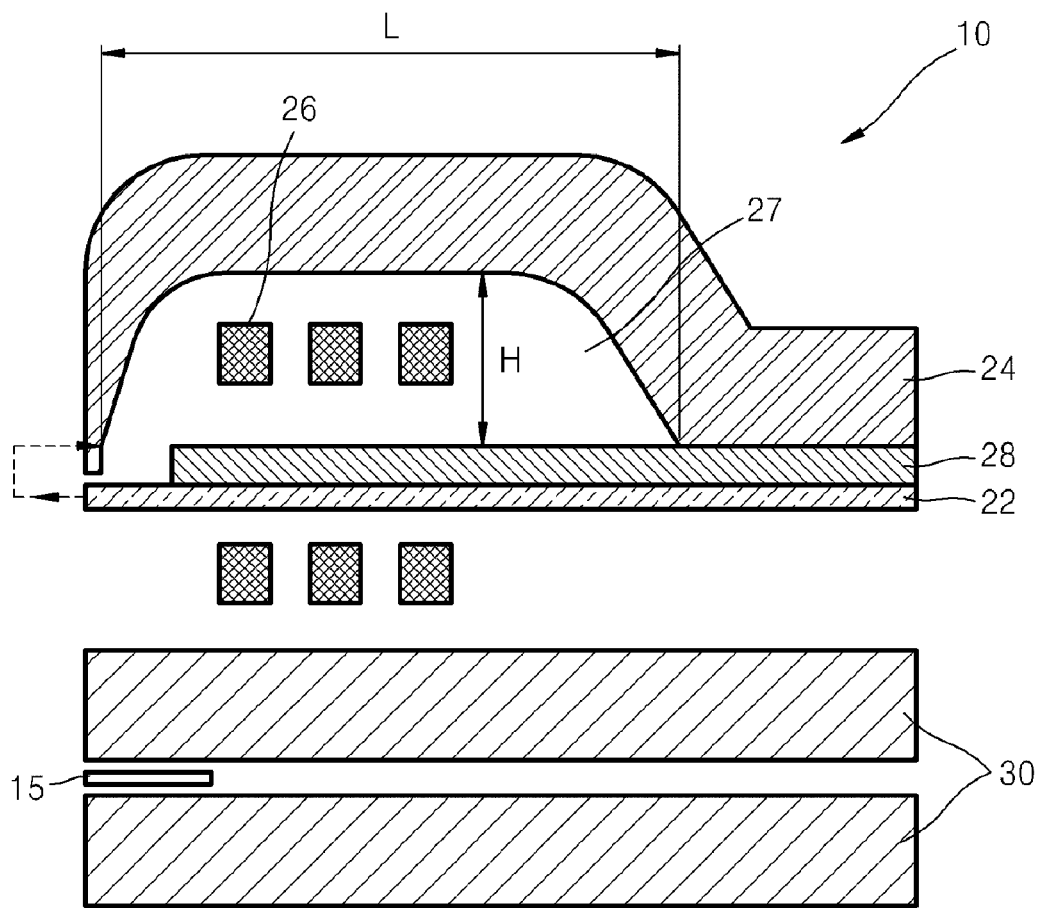
FIG. 1 is a schematic cross-sectional view of a related art perpendicular magnetic recording head.

A perpendicular magnetic recording head and a method of manufacturing the perpendicular magnetic recording head according to the present invention will now be described more fully with reference to the accompanying drawings in which exemplary embodiments of the present invention are shown. In the drawings, the thicknesses of layers and regions are exaggerated for clarity.

Figure 2A:
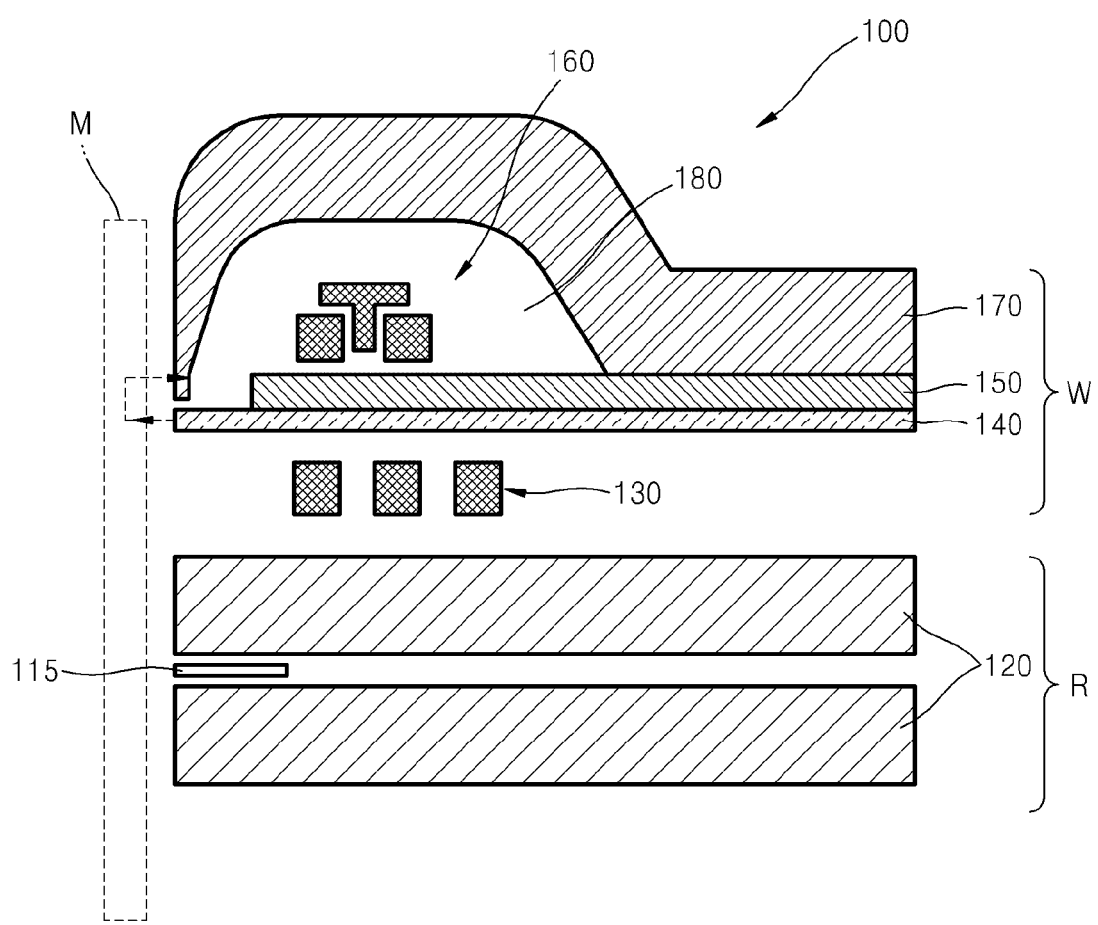
FIGS. 2A and 2B are schematic cross-sectional views of a perpendicular magnetic recording head according to an exemplary embodiment of the present invention.
Figure 2B:
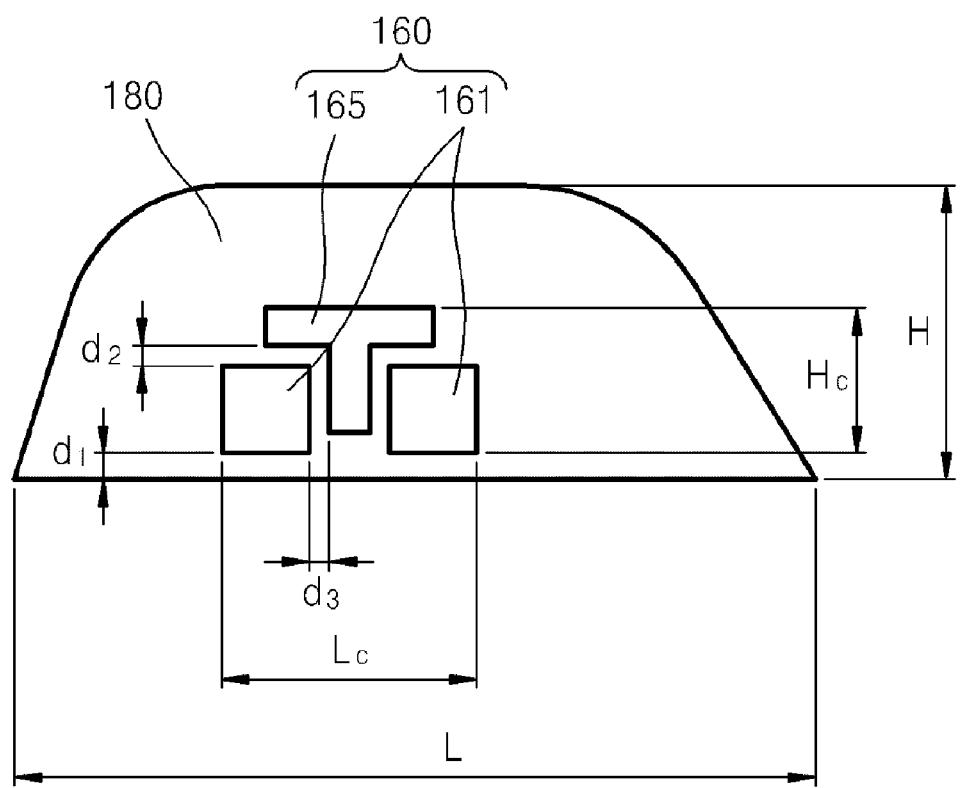

FIG. 2A is a schematic cross-sectional view of the structure of a perpendicular magnetic recording head 100 according to an exemplary embodiment of the present invention, and FIG. 2B is a detailed view of a portion of FIG. 2A.

Referring to FIGS. 2A and 2B, the perpendicular magnetic recording head 100, in order to record information onto a recording medium M, includes a recording head unit W that includes a main pole 140 that applies a magnetic field to the recording medium M, lower and upper coils 130 and 160 to which a current is applied to generate a magnetic field, and a return yoke 170 that forms a magnetic path of the magnetic field together with the main pole 140. The recording head unit W may further include a sub-yoke 150 that focus the magnetic flux at an end side of the recording medium M of the main pole 140. Also, in order to read information recorded on the recording medium M, the recording head unit W may further include a read head unit R that comprises two magnetic shield layers 120 and a magnetic resistance device 115 interposed between the two magnetic shield layers 120.

The main pole 140, the return yoke 170, and the sub-yoke 150 are formed of a magnetic material so that the main pole 140, the return yoke 170, and the sub-yoke 150 can form a magnetic path of a recording magnetic field that is generated by the lower and upper coils 130 and 160. Since the magnitude of the magnetic field focused at the end side of the main pole 140 is limited by the saturation magnetic flux density Bs, the main pole 140 is formed of a magnetic material having greater saturation magnetic flux density Bs than that of the return yoke 170 or the sub-yoke 150, for example, NiFe, CoFe, or CoNiFe. The sub-yoke 150 and the return yoke 170 may be formed to have a high magnetic permeability relative to that of the main pole 140 so that the sub-yoke 150 and the return yoke 170 can have rapid response with respect to the variation of the magnetic field at a high frequency. The sub-yoke 150 and the return yoke 170 can be mainly formed of a magnetic material such as NiFe, and at this point, the saturation magnetic flux density Bs and the magnetic permeability of the sub-yoke 150 and the return yoke 170 are appropriately designed by controlling the component ratio of Ni and Fe. The return yoke 170 is separated from the main pole 140. That is, a gap is formed on a side where the return yoke 170 and the main pole 140 face the recording medium M, and the gap is appropriately determined so that the magnetic field coming out from the main pole 140 can form a return path after the magnetic field magnetizes the recording medium M in a perpendicular direction. The gap may be formed to 500 nm or less. The sub-yoke 150 can further be formed on the upper surface of the main pole 140. The sub-yoke 150 is separated away from the recording medium M so that the magnetic field can be focused on the main pole 140 on an end side of the recording medium M.

The lower and upper coils 130 and 160 generate a recording magnetic field, and surround the upper and lower sides of the main pole 140 in a solenoid shape. The upper coil 160 that passes the upper side of the main pole 140 includes a plurality of first coils 161 and at least one second coil 165 having a cross-sectional shape different from that of the first coil 161. The second coil 165 is formed across upper regions of the two first coils 161 neighboring each other and a region between the two first coils 161. The second coil 165 may have, for example, a T shape cross-section. The first coil 161 and the second coil 165 may have the same cross-sectional area. A spacing d1 between the sub-yoke 150 and the first coil 161 may be approximately 2000 Å or less, preferably but not necessarily, 1000 Å or less. Also, spacings d2 and d3 between the first coil 161 and the second coil 165 may be approximately 2000 Å or less, preferably, 1000 Å or less. The spacing d1 can be formed by controlling a thickness of a portion interposed between the sub-yoke 150 and the first coils 161, in an insulating layer 180. The spacings d2 and d3 can be formed by controlling a thickness of a portion interposed between the first coils 161 and the second coil 165, in an insulating layer 180. For example, the above thicknesses can be readily controlled using an atomic layer deposition (ALD) method. The purpose of the structure of the upper coil 160 is to minimize the length of the magnetic path formed along the main pole 140, the sub-yoke 150, and the return yoke 170 by increasing the integration density of the upper coil 160 interposed between the return yoke 170 and the main pole 140. The insulating layer 180 is formed to insulate the area between the upper coil 160 and the return yoke 170 by covering the entire upper coil 160, and the smaller the horizontal length Lc and height Hc of the upper coil 160 are, the smaller the horizontal length L and height H of the insulating layer 180 are. Also, since the return yoke 170 is formed according to the shape of the insulating layer 180, the horizontal length L and height H of the insulating layer 180 approximately correspond to the horizontal length and height of the magnetic path. That is, due to the design in which the total length of the magnetic path is reduced, a perpendicular magnetic recording head 100 having small inductance can be realized.

Figure 3:
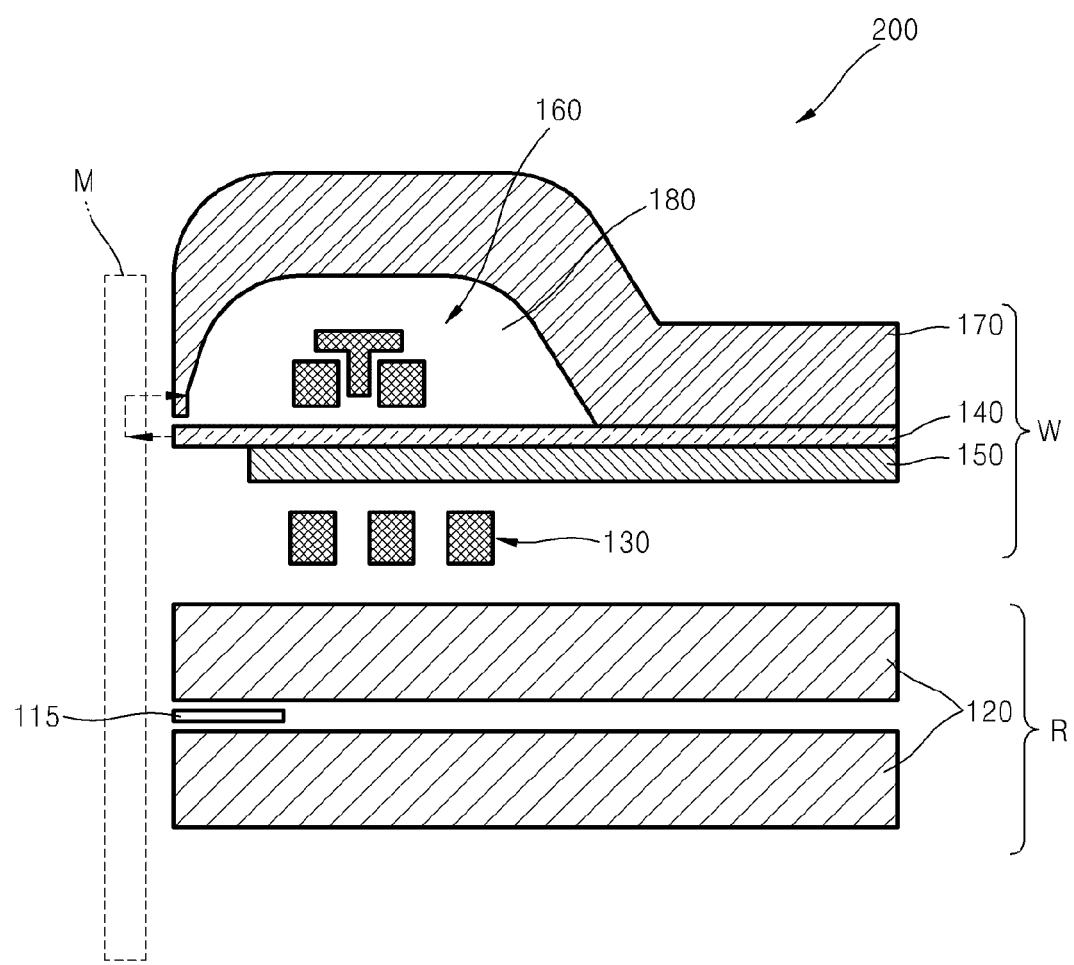
FIG. 3 is a schematic cross-sectional view of a perpendicular magnetic recording head according to another exemplary embodiment of the present invention.

FIG. 3 is a schematic cross-sectional view a perpendicular magnetic recording head 200 according to another exemplary embodiment of the present invention. In the perpendicular magnetic recording head 200 of FIG. 3, the locations of a main pole 140 and a sub-yoke 150 are different from the perpendicular magnetic recording head 100 of FIG. 2. That is, the sub-yoke 150 is formed under the main pole 140. The rest of the configuration of the perpendicular magnetic recording head 200 is substantially the same as that of the perpendicular magnetic recording head 100 of FIG. 2A. Therefore, the perpendicular magnetic recording head 200 having a low inductance can be realized by increasing the integration density of the coils.

In FIGS. 2 and 3, the lower and upper coils 130 and 160 form a solenoid structure in which the main pole 140 is surrounded three times. However, it is described as an example and the number of turns can be changed. Also, the first coils 161 and the second coil 165 respectively exemplarily have a rectangular shape cross-section and a T shape cross-section. Generally, in a shape that is realized in an actual manufacturing process, upper corner portions of the shape are generally cut away.

Figure 4A:
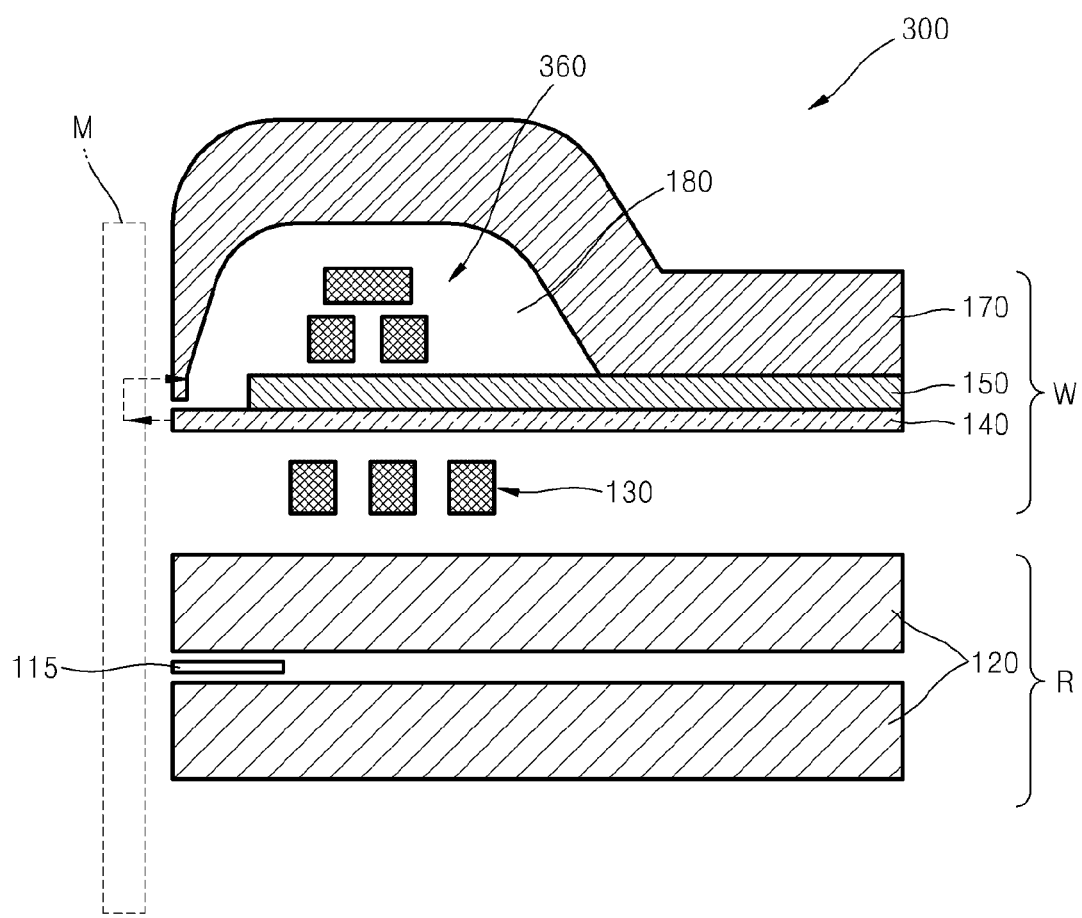
FIGS. 4A and 4B are schematic cross-sectional views of a perpendicular magnetic recording head according to another exemplary embodiment of the present invention.
Figure 4B:
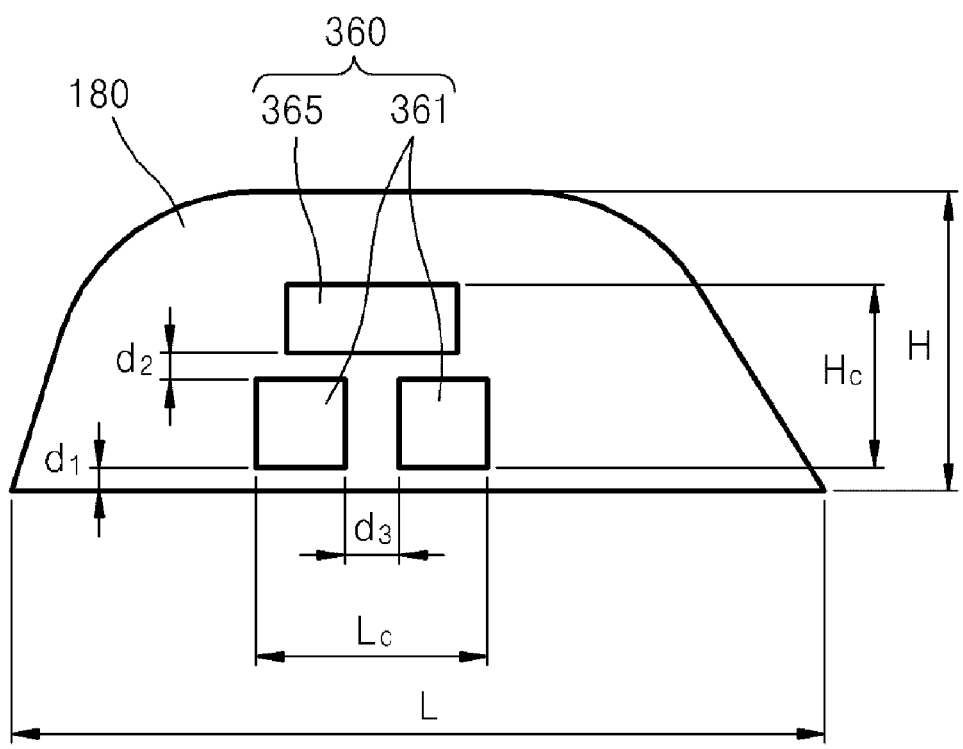

FIG. 4A is a schematic cross-sectional view of a perpendicular magnetic recording head 300 according to an exemplary embodiment of the present invention, and FIG. 4B is a detailed view of a portion of FIG. 4A. In the perpendicular magnetic recording head 300 according to the present exemplary embodiment, the structure of lower and upper coils 130 and 360 is different from that of the lower and upper coils 130 and 160 of FIG. 2A, and the rest of the configuration is substantially identical to the perpendicular magnetic recording head 100. Thus, only the differences will now be described. The lower and upper coils 130 and 360 generate a recording magnetic field, and surround the upper and lower sides of the main pole 140 in a solenoid shape. The upper coil 360 that passes the upper side of the main pole 140 includes a plurality of first coils 361 and at least one second coil 365 having a cross-sectional shape different from that of the first coil 361. The second coil 365 is formed across upper regions of the two first coils 361 neighboring each other. The first coil 361 and the second coil 365 may have the same cross-sectional area. When the first and second coils 361 and 365 are configured as described above, the cross-sectional shape of the second coil 365 has a horizontal length greater than that of the first coils 361 and a height smaller than that of the first coils 361. A spacing d1 between the sub-yoke 150 and the first coil 361 may be approximately 2000 Å or less, preferably but not necessarily, 1000 Å or less. Also, a spacing d2 between the first coil 361 and the second coil 365 may be approximately 2000 Å or less, preferably but not necessarily, 1000 Å or less. A spacing d3 between the first coils 361 adjacent to each other may be minimized to a size that allows plating the first coils 361. The spacing d1 can be formed by controlling the thickness of the portion interposed between the sub-yoke 150 and the first coils 361, in an insulating layer 180. The spacing d2 can be formed by controlling the thickness of the portion interposed between the first coils 361 and the second coil 365, in an insulating layer 180. For example, the above thicknesses can be readily controlled using an ALD method. The purpose of the structure of the upper coil 360 is also to minimize the length of the magnetic path by increasing the integration density of the upper coil 360 interposed between the return yoke 170 and the main pole 140. The upper coil 360 according to the present exemplary embodiment has a structure in which the horizontal length Lc is shorter than the upper coil 160 of FIG. 2A, and the height Hc is higher than the upper coil 160. Thus, the insulating layer 180 also has a structure in which the horizontal length Lc is smaller than the insulating layer 180 of FIG. 2A, and the height Hc is greater than that of the insulating layer 180 of FIG. 2A. In view of the total length of the magnetic path, the efficiency of the structures of the coils of FIGS. 2A and 4A will be determined according to the aspect ratio of the cross-sectional area of the coils. Therefore, the structure of the coils may be appropriately selected in consideration of the aspect ratio.

Figure 5:
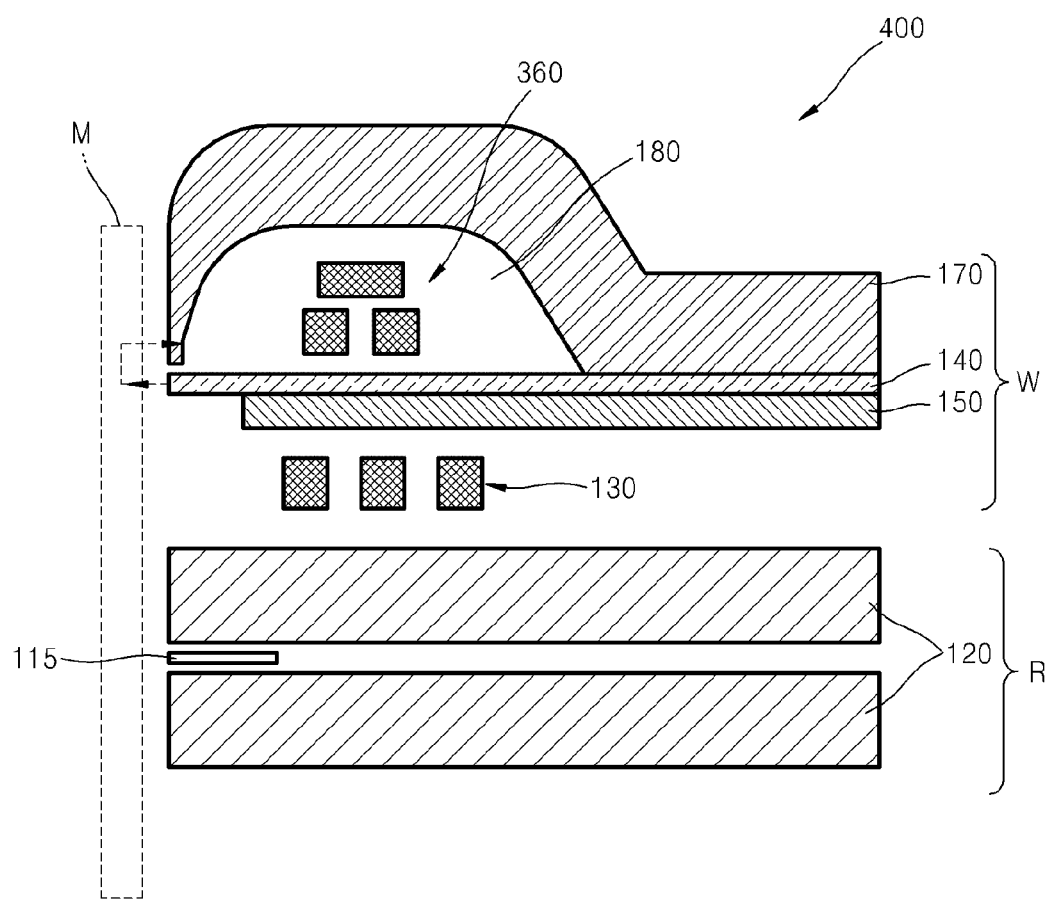
FIG. 5 is a schematic cross-sectional view of a perpendicular magnetic recording head according to another exemplary embodiment of the present invention.

FIG. 5 is a schematic cross-sectional view of a perpendicular magnetic recording head 400 according to another exemplary embodiment of the present invention. The perpendicular magnetic recording head 400 in FIG. 5 is different from the perpendicular magnetic recording head 300 of FIG. 4 in that the locations of the main pole 140 and the sub-yoke 150 are inversed. That is, the sub-yoke 150 is formed on a lower surface of the main pole 140, and the rest of the configuration is substantially identical to the configuration of the perpendicular magnetic recording head 300 of FIG. 4. Accordingly, the perpendicular magnetic recording head 400 having a small inductance can be realized by increasing the integration density of the coils.

In FIGS. 4 and 5, the lower and upper coils 130 and 360 form a solenoid structure in which the main pole 140 is surrounded three times. However, it is described as an example and the number of turns may be changed. Also, the cross-sectional shapes of the first coils 361 and the second coil 365 are exemplarily described. Generally, in a shape that is realized in an actual manufacturing process, upper corner portions of the shape are generally cut away.

Figure 6A:
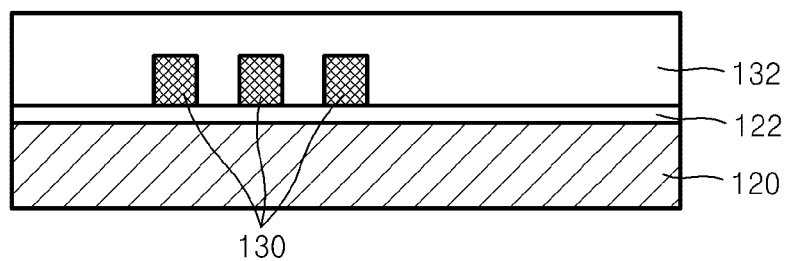
FIGS. 6A through 6J are cross-sectional views illustrating a method of manufacturing a perpendicular magnetic recording head according to an exemplary embodiment of the present invention.
Figure 6B:
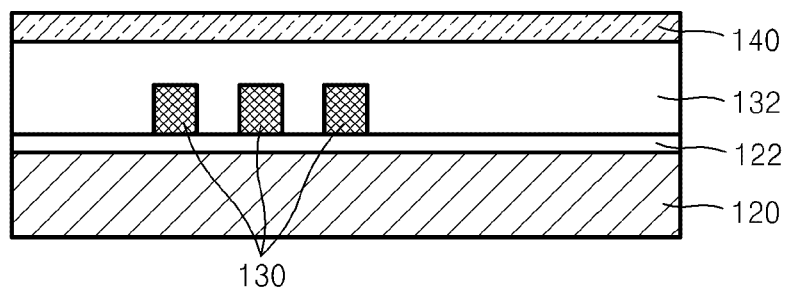
Figure 6C:
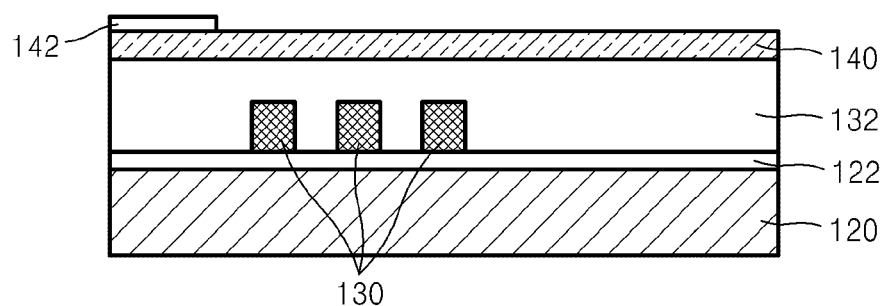
Figure 6D:
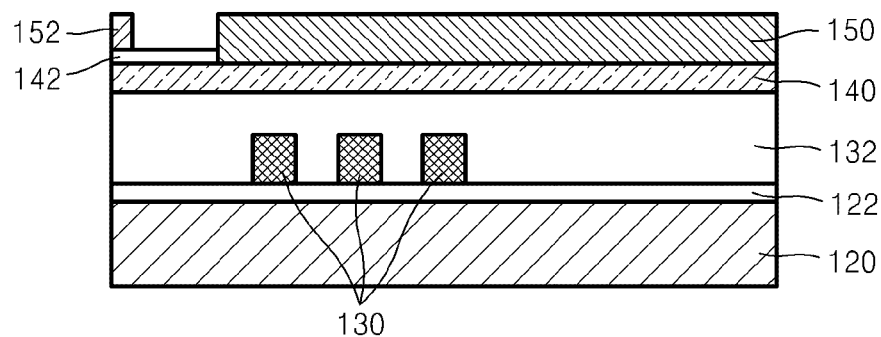
Figure 6E:
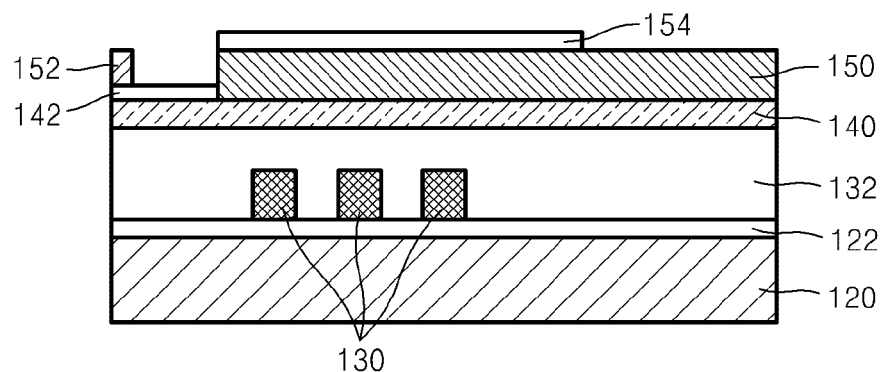
Figure 6F:
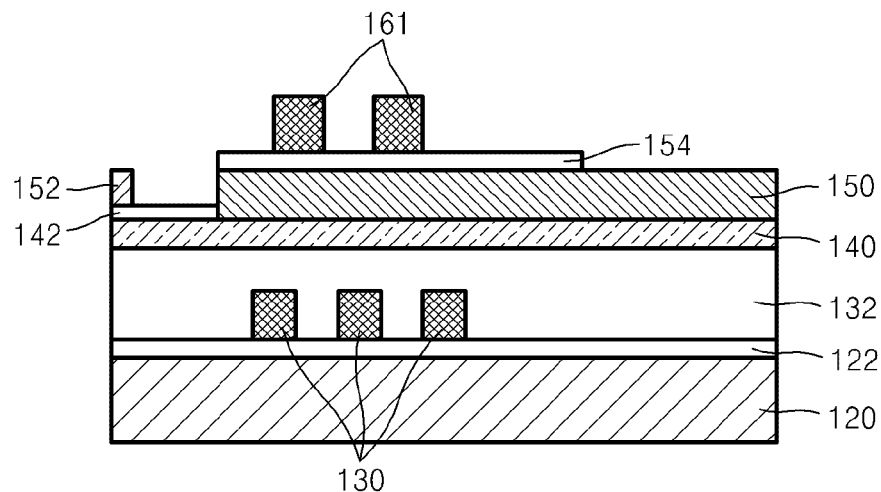
Figure 6G:
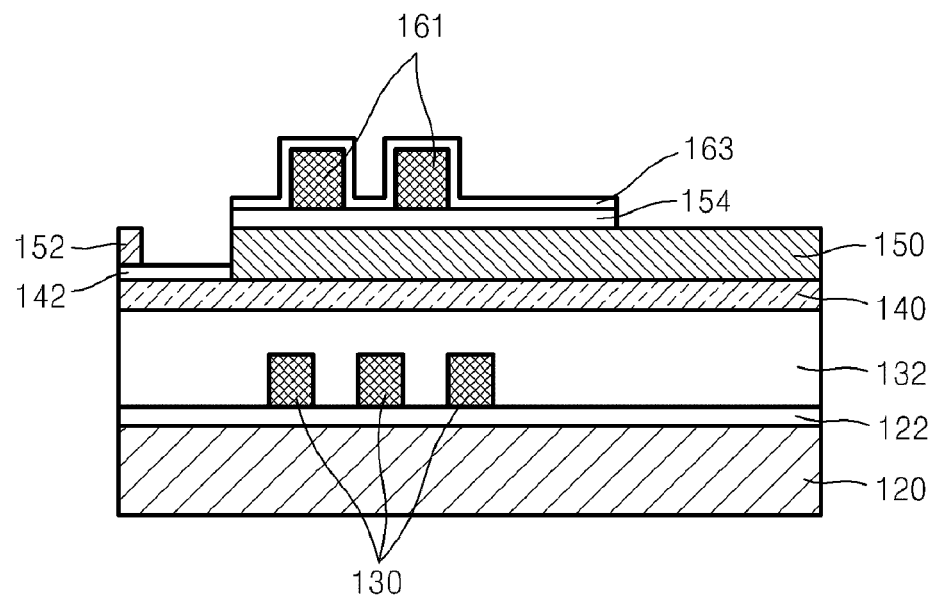
Figure 6H:
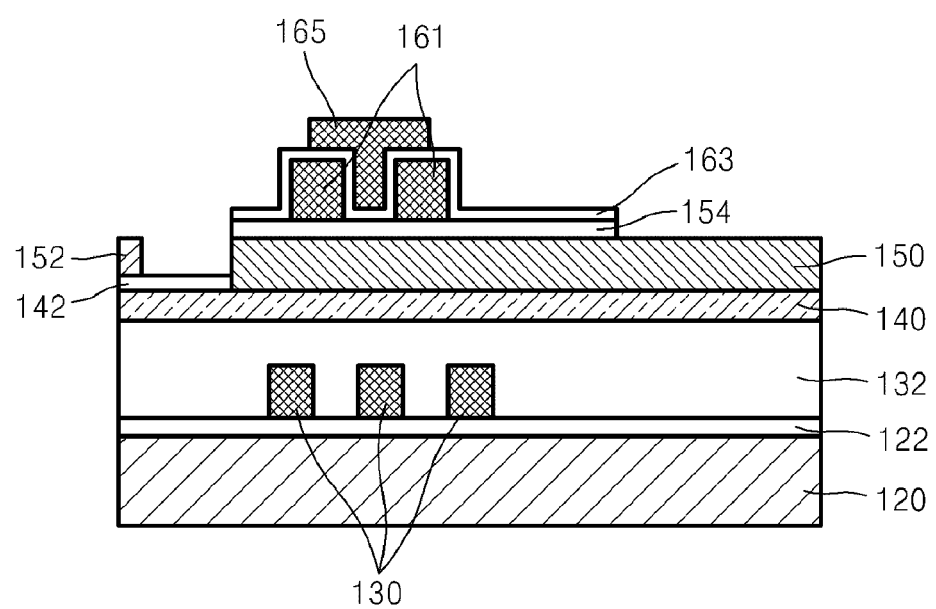
Figure 6I:
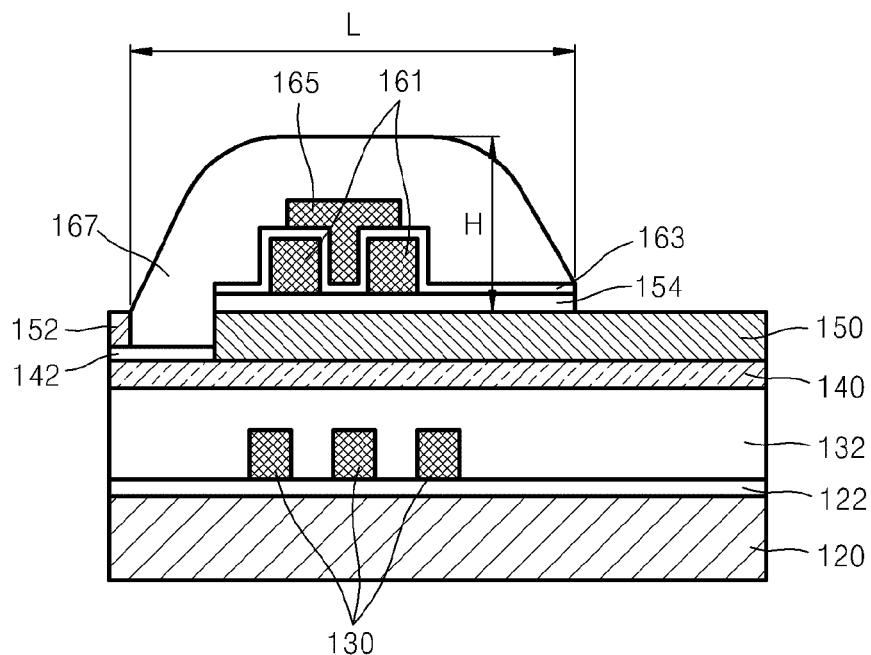
Figure 6J:
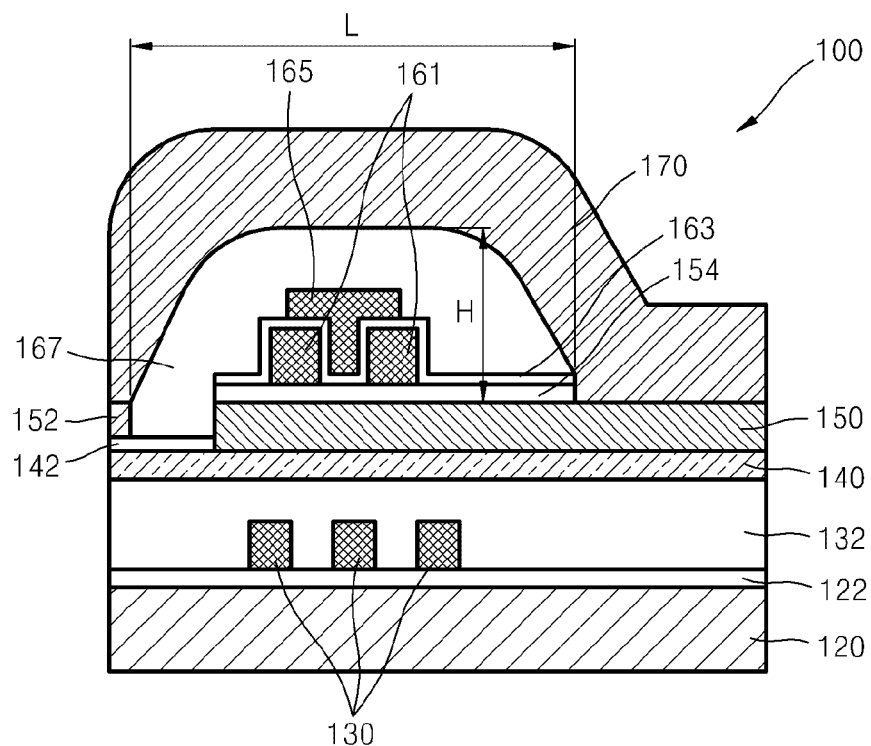

A method of manufacturing a perpendicular magnetic recording head 100 of FIG. 2A according to an exemplary embodiment of the present invention will now be described. FIGS. 6A through 6J are cross-sectional views illustrating a method of manufacturing the perpendicular magnetic recording head 100 of FIG. 2A according to an exemplary embodiment of the present invention. Referring to FIG. 6A, after forming a first insulating layer 122 on a magnetic shield layer 120, a lower coil layer 130 is formed, and a second insulating layer 132 covering the entire lower coil layer 130 is formed. The first and second insulating layers 122 and 132 can be formed by spin coating a photoresist and baking the photoresist or by depositing an insulating material such as $Al_2O_3$ or $SiO_2$. Referring to FIG. 6B, a main pole 140 is formed on the second insulating layer 132 by depositing or plating a magnetic material having a large saturation magnetic flux density Bs such as CoFe, NiFe, or CoNiFe. Referring to FIG. 6C, a gap layer 142 is formed on an end side of the main pole 140 by depositing an insulating material, for example, $Al_2O_3$ or $SiO_2$. A side of the perpendicular magnetic recording head 100 on which the gap layer 142 is formed faces a recording medium M. Referring to FIG. 6D, a return yoke tip 152 is formed on a portion of end region of the gap layer 142, and a sub-yoke 150 is formed on the region of the main pole 140 where the gap layer 142 is not formed. The return yoke tip 152 and the sub-yoke 150 are formed of a soft magnetic material having high magnetic permeability, and can be formed by a plating or deposition method using the same material, for example, NiFe. Referring to FIG. 6E, a third insulating layer 154 is formed on the sub-yoke 150. The third insulating layer 154 is formed to insulate the sub-yoke 150 from first coils 161 (refer to FIG. 6F) which will be formed on the third insulating layer 154, and may have a minimum thickness required to insulate the sub-yoke 150 from the first coils 161. The third insulating layer 154 may have a thickness of approximately 2000 Å or less, and preferably but not necessarily, 1000 Å or less. The third insulating layer 154 can be formed using a related art method by spin coating a photoresist on the sub-yoke 150 and then baking the photoresist or by depositing $Al_2O_3$ or $SiO_2$ on the sub-yoke 150 using a sputtering method or a chemical vapor deposition (CVD) method. Also, if an ALD method is used to form the third insulating layer 154, the thickness of the third insulating layer 154 can be controlled to an atom unit, and thus, the third insulating layer 154 can be formed to be thin. Referring to FIG. 6F, the first coils 161 are formed on the third insulating layer 154. The first coils 161 can be formed by plating a material having high conductivity such as Cu. That is, after depositing a seed layer (not shown)

on the entire surface of the third insulating layer 154, the seed layer is patterned according to the shape of the first coils 161, and then, is plated. A spacing between the adjacent first coils 161 is appropriately determined in consideration of the cross-sectional shape of a second coil 165 (refer to FIG. 6H), which will be formed in a subsequent process. Referring to FIG. 6G, a fourth insulating layer 163 that covers upper surfaces and side surfaces of the first coils 161 is formed. The fourth insulating layer 163 is formed to insulate the first coils 161 from the second coil 165, and may have a minimum thickness required for insulation. The fourth insulating layer 163 may have a thickness of approximately 2000 Å or less, preferably but not necessarily, 1000 Å or less. The fourth insulating layer 163 can be formed by depositing, for example, $Al_2O_3$ using an ALD method. When the ALD method is used, the upper surfaces and side surfaces of the first coils 161 can be thoroughly covered since the ALD method has a high step coverage characteristic. Referring to FIG. 6H, the second coil 165 is formed across a region between the first coils 161 and the upper region of the first coils 161. The second coil 165 can be formed by a depositing a seed layer (not shown) on the entire surface of the fourth insulating layer 163, patterning the seed layer, and plating the patterned seed layer using a material having high conductivity such as Cu. The second coil 165 may have a T shape cross-section, and may have the same cross-sectional area as the first coils 161. Referring to FIG. 6I, a fifth insulating layer 167 that covers the entire second coil 165, the fourth insulating layer 163, the sub-yoke 150, and the gap layer 142 is formed. The fifth insulating layer 167 can be formed by spin coating, for example, a photoresist on the second coil 165, the fourth insulating layer 163, the sub-yoke 150, and the gap layer 142, and then baking the photoresist. The fifth insulating layer 167 can be formed by depositing $Al_2O_3$ to a thickness of 2000 Å or less, preferably but not necessarily, 1000 Å or less using an ALD method, or can be formed by re-spin coating the photoresist and baking the photoresist on the $Al_2O_3$ which is deposited using the ALD method. At this point, since the first coils 161 and the second coil 165 that pass above the main pole 140 have increased integration density, the horizontal length L and the height H of the fifth insulating layer 167 can be minimized. Referring to FIG. 6J, a return yoke 170 is formed on the fifth insulating layer 167. The return yoke 170 can be formed by depositing or plating a magnetic material such as NiFe. The perpendicular magnetic recording head 100 formed as described above, the total length of a magnetization path formed along the main pole 140, the sub-yoke 150, and the return yoke 170 can be effectively reduced, thereby realizing a structure of a perpendicular magnetic recording head having a low inductance.

Figure 7A:
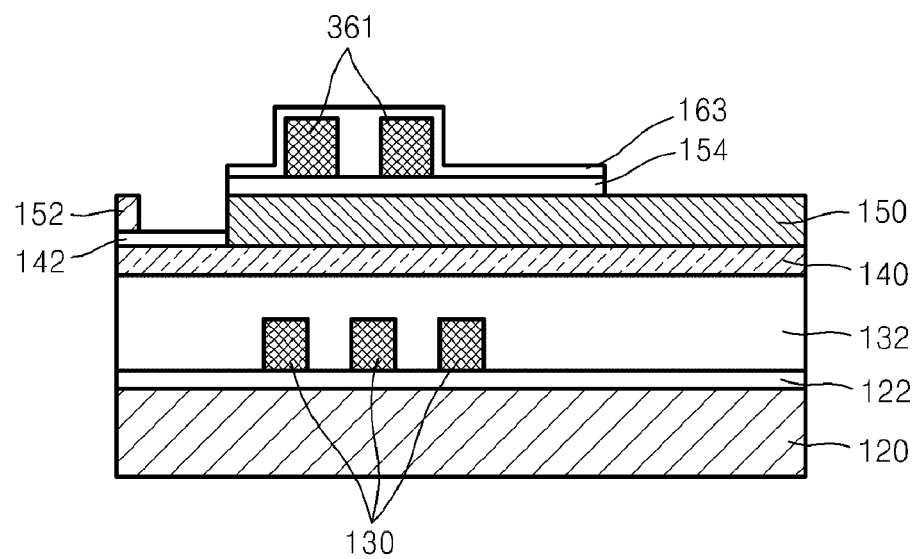
FIGS. 7A through 7C are cross-sectional views illustrating a method of manufacturing a perpendicular magnetic recording head according to another exemplary embodiment of the present invention.
Figure 7B:
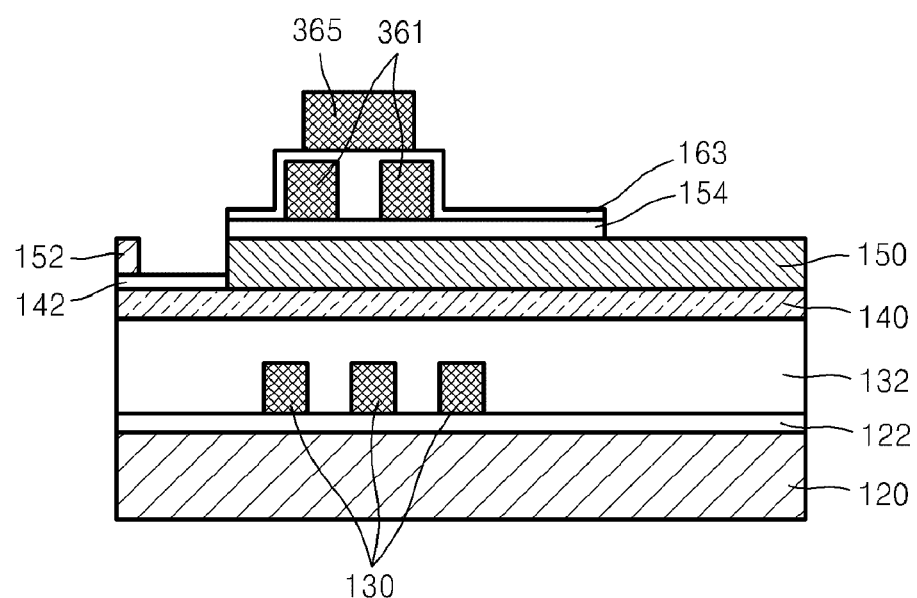
Figure 7C:
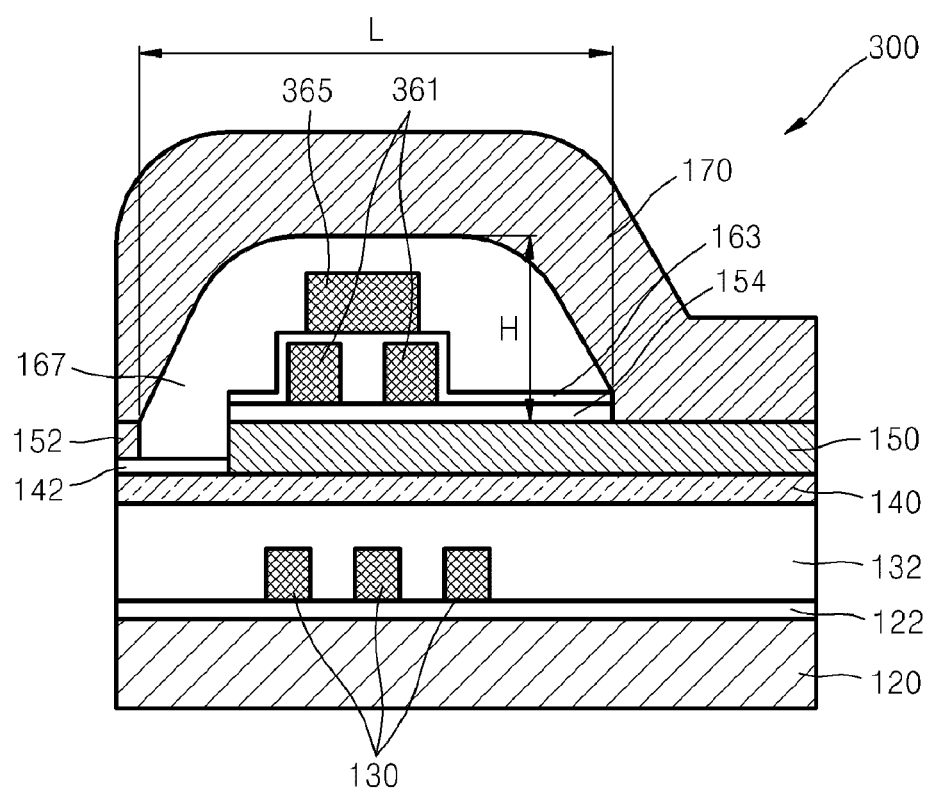

FIGS. 7A through 7C are cross-sectional views illustrating a method of manufacturing a perpendicular magnetic recording head 300 of FIG. 4A according to another exemplary embodiment of the present invention. In the present exemplary embodiment, the differences between the method described with reference to FIGS. 6A through 6J will be described. Referring to FIG. 7A, after performing the processes of FIG. 6A through 6E, first coils 361 are formed on the third insulating layer 154, and then, the fourth insulating layer 163 is formed to cover the entire first coils 361. At this point, since a coil will not be formed in a space between the first coils 361, a spacing between the first coils 361 may be minimized to a size that allows a plating process. The fourth insulating layer 163 is formed to insulate the first coils 361 from a second coil 365 (refer to FIG. 7B) which will be formed on the first coils 361, and thus, the fourth insulating layer 163 may be formed to a minimum thickness required for insulation. The fourth insulating layer 163 may be formed to a thickness of 2000 Å or less, preferably but not necessarily, 1000 Å or less. The fourth insulating layer 163 can be formed by depositing $Al_2O_3$ using an ALD method. Referring to FIG. 7B, the second coil 365 is formed on the fourth insulating layer 163. The second coil 365 is formed across the upper surfaces of the first coils 361 which are adjacent to each other. The second coil 365 may have the same cross-sectional area as the first coils 361. Referring to FIG. 7C, a fifth insulating layer 167 that covers entire the second coil 365, the fourth insulating layer 163, the sub-yoke 150, and the gap layer 142 is formed, and a return yoke 170 is formed on the fifth insulating layer 167. The fifth insulating layer 167 can be formed by spin coating, for example, a photoresist on the second coil 365, the fourth insulating layer 163, the sub-yoke 150, and the gap layer 142, and then baking the photoresist. The fifth insulating layer 167 can be formed by depositing $Al_2O_3$ to a thickness of 2000 Å or less, preferably but not necessarily, 1000 Å or less using an ALD method, or can be formed by re-spin coating the photoresist and baking the photoresist on the $Al_2O_3$ deposited using the ALD method. The return yoke 170 can be formed by depositing or plating a magnetic material such as NiFe on the fifth insulating layer 167. The perpendicular magnetic recording head 300 manufactured using the method described above has a reduced horizontal length L and an increased height H compared to the perpendicular magnetic recording head 100 manufactured using the method described with reference to FIGS. 6A through 6J, and thus has a structure in which the total length of the magnetic path is effectively reduced.

The methods of manufacturing perpendicular magnetic recording heads 100 and 300 according to the exemplary embodiments of the present invention are characterized by the processes of forming the upper coils 160 and 360, and each of the insulating layers 154, 163 and 167. The other processes are exemplary, and thus, the process sequence or process structure may vary according to one of ordinary skill in the art. For example, in the present invention, the main pole is formed first, and the sub-yoke is formed on the upper surface of the main pole. However, the sub-yoke can be formed first, and the main pole can be formed on the upper surface of the sub-yoke.

As described above, in a perpendicular magnetic recording head according to the exemplary embodiments of the present invention, since an upper coil layer has a structure in which the integration density of coils is increased, a magnetization path is minimized, and the inductance of the perpendicular magnetic recording head is reduced. Therefore, the perpendicular magnetic recording head according to the exemplary embodiments of the present invention is advantageous for high density recording with a high frequency current. A method of manufacturing the perpendicular magnetic recording head according to the exemplary embodiments of the present invention effectively reduces the thickness of insulating layers by employing an ALD method.

While a perpendicular magnetic recording head and a method of manufacturing the same according to the present invention have been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A perpendicular magnetic recording head that comprises:
   a main pole;
   a return yoke; and
   coils that surround upper and lower parts of the main pole in a solenoid shape so that the main pole generates a magnetic field for recording information onto a recording medium,
   wherein a portion of the coils that pass above the main pole comprises a plurality of first coils and at least one second coil having a cross-sectional shape different from that of the first coils, and
   the second coil is formed across upper regions of two first coils adjacent to each other from among the plurality of first coils.

2. The perpendicular magnetic recording head of claim 1, wherein the second coil is formed in a region between the two first coils adjacent to each other and across upper regions of each of the two first coils.

3. The perpendicular magnetic recording head of claim 2, wherein the second coil has a T shape cross-section.

4. The perpendicular magnetic recording head of claim 1, wherein each of the plurality of first coils and the second coil have the same cross-sectional areas.

5. The perpendicular magnetic recording head of claim 1, further comprising an insulating layer having a thickness of 2000 Å or less between the plurality of first coils and the second coil.

6. The perpendicular magnetic recording head of claim 5, wherein the insulating layer is formed using an atomic layer deposition (ALD) method.

7. The perpendicular magnetic recording head of claim 1, further comprising a sub-yoke separated a given distance from an end of the main pole facing the recording medium so that a magnetic field is focused on the end of the main pole facing the recording medium.

8. The perpendicular magnetic recording head of claim 7, wherein the main pole has a saturation magnetic flux density greater than that of the sub-yoke.

9. The perpendicular magnetic recording head of claim 7, wherein the sub-yoke is formed on an upper or lower surface of the main pole.

10. The perpendicular magnetic recording head of claim 9, further comprising an insulating layer having a thickness of 2000 Å or less between the sub-yoke and the plurality of first coils or between the main pole and the plurality of first coils.

11. The perpendicular magnetic recording head of claim 10, wherein the insulating layer is formed using an atomic layer deposition (ALD) method.

12. A method of manufacturing a perpendicular magnetic recording head that comprises coils surrounding upper and lower parts of a main pole in a solenoid shape, the method comprising:
   (a) forming a lower coil layer on a magnetic shield layer;
   (b) forming a magnetic layer comprising a main pole on the lower coil layer;
   (c) forming a first insulating layer on the magnetic layer; and
   (d) forming an upper coil layer that comprises a plurality of first coils and at least one second coil formed across upper regions of two first coils adjacent to each other among the plurality of first coils on the first insulating layer.

13. The method of claim 12, wherein the forming an upper coil layer comprises:
   forming the plurality of first coils on the first insulating layer;
   forming a second insulating layer that surrounds upper and side surfaces of each of the plurality of first coils; and
   forming the at least one second coil in a region between the two first coils adjacent to each other and across upper regions of each of the two first coils among the plurality of first coils on the second insulating layer.

14. The method of claim 13, wherein the second coil has a T shape cross-section.

15. The method of claim 13, wherein each of the plurality of first coils and the second coil have the same cross-sectional areas.

16. The method of claim 13, wherein the second insulating layer has a thickness of 2000 Å or less.

17. The method of claim 13, wherein the second insulating layer is formed using an atomic layer deposition (ALD) method.

18. The method of claim 12, wherein the forming of an upper coil layer comprises:
   forming the plurality of first coils on the first insulating layer;
   forming a second insulating layer that covers the plurality of first coils; and
   forming the at least one second coil across upper regions of each of the two first coils adjacent to each other among the plurality of first coils on the second insulating layer.

19. The method of claim 18, wherein each of the plurality of first coils and the second coil have the same cross-sectional areas.

20. The method of claim 18, wherein the second insulating layer is formed to a thickness of 2000 Å or less to cover upper surfaces of the plurality of first coils.

21. The method of claim 18, wherein the second insulating layer is formed using an atomic layer deposition (ALD) method.

22. The method of claim 12, wherein the first insulating layer is formed to a thickness of 2000 Å or less.

23. The method of claim 22, wherein the first insulating layer is formed using an atomic layer deposition (ALD) method.

24. The method of claim 12, wherein the forming a magnetic layer comprising a main pole on the lower coil layer comprises:
   forming the main pole on the lower coil layer; and
   forming a sub-yoke having an end separated from an end of the main pole on an upper surface of the main pole.

25. The method of claim 12, wherein the forming a magnetic layer comprising a main pole on the lower coil layer comprises:
   forming a sub-yoke on the lower coil layer; and
   forming a main pole having an end separated from an end of the sub-yoke on an upper surface of the sub-yoke.

* * * * *